United States Patent [19]

Nakamura et al.

[11] Patent Number: 4,912,524
[45] Date of Patent: Mar. 27, 1990

[54] DIGITAL SIGNAL TRANSMISSION SYSTEM HAVING CONVERSION MEANS FOR REDUCING THE LIGHT EMISSION TIME OF A LIGHT EMITTING DIODE

[75] Inventors: Masafumi Nakamura; Tosifumi Takeuchi; Yutaka Nagai, all of Yokohama, Japan

[73] Assignee: Hitachi, Ltd., Tokyo, Japan

[21] Appl. No.: 126,506

[22] Filed: Nov. 30, 1987

[30] Foreign Application Priority Data

Dec. 17, 1986 [JP] Japan .................................. 61-298704

[51] Int. Cl.$^4$ .............................................. H04B 9/00
[52] U.S. Cl. ..................................... 455/608; 307/266; 328/58; 375/22; 455/617; 455/618
[58] Field of Search ............... 455/601, 608, 609, 610, 455/612, 617, 618, 619; 375/22; 307/265, 266; 328/58

[56] References Cited

U.S. PATENT DOCUMENTS

| 4,151,407 | 4/1979 | McBride | 455/617 |
| 4,217,488 | 8/1980 | Hubbard | 455/608 |
| 4,354,278 | 10/1982 | Clarke | 455/617 |
| 4,451,916 | 5/1984 | Casper et al. | 455/601 |
| 4,524,462 | 6/1985 | Cottatelucci | 455/608 |
| 4,563,774 | 1/1986 | Gloge | 455/607 |
| 4,623,887 | 11/1986 | Welles | 455/603 |

FOREIGN PATENT DOCUMENTS 0089601 8/1978 Japan .................................. 455/608

Primary Examiner—Robert L. Griffin
Assistant Examiner—L. Van Beek
Attorney, Agent, or Firm—Antonelli, Terry & Wands

[57] ABSTRACT

The invention relates to a system to transmit digital signals reproduced from a compact disk player, a digital audio tape recorder or the like. In order to increase the S/N ratio of transmission of the digital signals, the occurrence probability of data to be transmitted is made low and light emission time of a light emission element is made small, and the peak value of emission is increased corresponding to the above reduction. As a result, the S/N ratio can be increased in the same transmission band as that in the prior art. In order to reduce the occurrence probability of data, a method of generating pulses at the leading edge and the trailing edge of a pulse signal or a method of compressing data is provided.

1 Claim, 4 Drawing Sheets

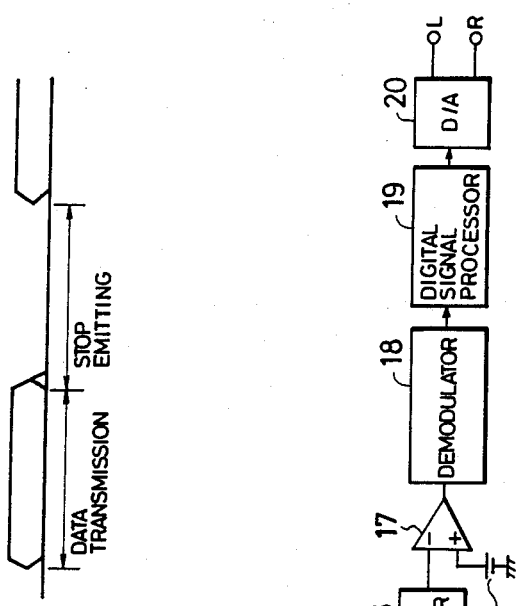
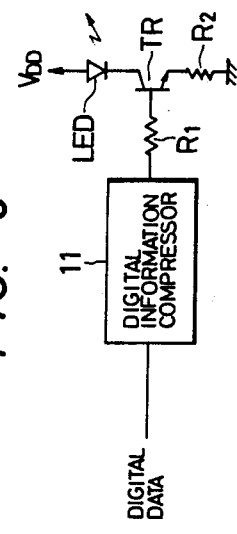
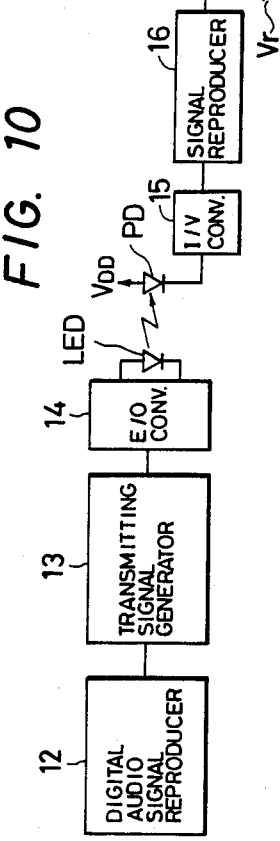
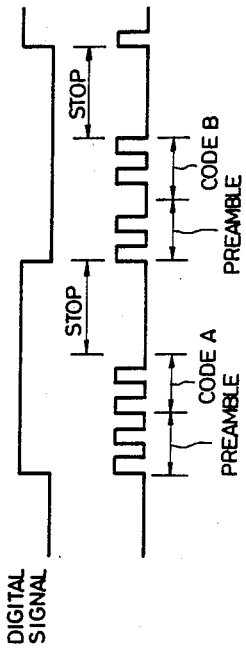

DIGITAL SIGNAL TRANSMISSION SYSTEM HAVING CONVERSION MEANS FOR REDUCING THE LIGHT EMISSION TIME OF A LIGHT EMITTING DIODE

BACKGROUND OF THE INVENTION

The present invention relates to a digital signal transmission system, more particularly, to a transmission system favorable for the improvement of the S/N ratio at the time of transmitting digital signals by light.

Such kind of systems have been disclosed, for instance, in U.S. Pat. No. 4,259,746. In case of transmitting digital signals by light in the system, a light emission diode on the transmission side sends out light all the time at the level value between "1" and "0" in average, without taking it into consideration that the S/N ratio should be made higher by lessening the light emission time of the light emission diode so as to increase the peak light emission amount.

SUMMARY OF THE INVENTION

An object of the invention is to realize the transmission with the better value of the S/N ratio by lessening the emission time of the light emission diode so as to increase the peak value of the light emission when the digital data are transmitted by light.

The foregoing object is achieved by driving the light emission element after lessening the average light emission time so as to increase the peak light emission amount after the occurrence probability of the data is reduced by the signal converting means.

The digital data is converted by the signal converting means into signals having a low occurrence probability of the data which make the light emission diode emit light. By making the light emission diode emit light according to the converted signals, the average amount of light emitted from the light emission diode is reduced, and by increasing the peak amount of light emitted from the light emission diode by as much as the reduced amount, the transmission with the better S/N ratio can be executed with as much amount of the light emitted from the light emission diode as before the signals are converted.

BRIEF DESCRIPTION OF THE DRAWINGS

FIG. 8 is a diagram illustrating another embodiment of the present invention;

FIG. 9 is a diagram illustrating the operation in FIG. 8;

FIG. 10 is an explanation diagram of a further embodiment of the present invention;

FIG. 11 is a diagram illustrating the operation of a further embodiment of the present invention.

DESCRIPTION OF THE PREFERRED EMBODIMENTS

Figure 1:
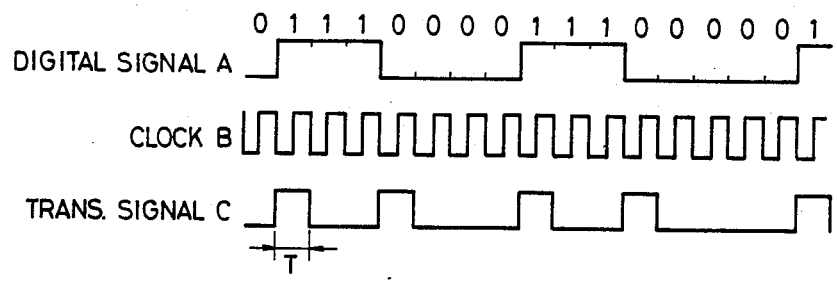
FIG. 1 is an explanation view of an embodiment of the present invention.

An embodiment of the present invention will now be described referring to FIG. 1. FIG. 1 shows the way to convert the digital signals into the transmission signals according to the invention. In FIG. 1, A designates a digital signal with transmission rate 1/T (bit/sec), the minimum duration at the level "1" and "0" being 2T or more, and the occurrence probability of 50%, B designates a bit synchronizing clock of the digital signal A, and C designates a transmission signal according to the invention.

Next, the converting means for converting the digital signal A into the transmission signal C will be described. The transmission signal C generates pulse of the level "1" with time width T at the changing point of the digital signal A from the level "0" to the level "1" and the changing point from the level "1" to the level "0", and remains at the level "0" except at the changing point by the conversion. The digital signal A has the minimum pulse duration being 2T or more, and its occurrence probability of the level "1" and the level "0" is 50%. Let the maximum duration of the systematic pulse be nT, then the occurrence probability of the transmission signal at the level "1" will be calculated.

Let each occurrence probability of 2T, 3T, ... nT be $P_2, P_3, \ldots P_n$, then the occurrence probability P of the transmission signal C at the level "1" is $$P = P_2 \times \frac{1}{2} + P_3 \times \frac{1}{3} + \ldots + P_n \times \frac{1}{n} = \sum_{R=2}^{n}\left(P_k \times \frac{1}{k}\right) \quad (1)$$

Since the occurrence probability of the level "1" of the digital signal A is 50%, with respect to the digital signal A whose probability becomes P<0.5, the occurrence probability of the level "1" can be reduced according to the present embodiment (signal C). For example, in a CD (compact disk) which records and reproduces digital audio data on a disk, modulation is effected to the transmission rate 1/T (bit/sec) as the recording signal format so that the duration of the level "1" or the level "0" becomes 3T~11T. Since the occurrence probability of the level "1" or "0" is 50%, if regarding the occurrence probability of signals with length of 3T~11T as being in inverse proportion to the duration, then $$P_n = (11 + 3 - n) / \left(\sum_{K=3}^{11} K\right).$$

Therefore $$P = \sum_{M=3}^{11} P_n \times \frac{1}{n} = 19.5\%$$

and the occurrence of the level "1" can be reduced into about 1/2.5.

According to the present embodiment, the occurrence probability of the level "1" of the digital signal can be reduced without widening the transmission band range by narrowing the pulse width T corresponding to the data transmission rate 1/T. If the average current of the light emission diode on the transmitting side is kept constant, the peak amount of the light emitted can be made large and the transmission with the better S/N ratio can be executed.

Next, the transmission signal generating means of the invention will be described referring to FIGS. 2 and 3. Numerals 1 and 2 in FIG. 2 designate D-FFs (D type flipflops) which store the data inputted in the terminal D at the falling edge of the clock inputted in the CK terminal, and then output the stored data to the terminal Q, numeral 3 designates an inverter, and numeral 4 designates an exclusive OR gate (EXOR). A and B designate input terminals which input the signals A and B in FIG. 1, and C designates an output terminal which outputs the signal C in FIG. 1. FIG. 3 is a timing chart illustrating the operation of each part in FIG. 2.

Figure 2:
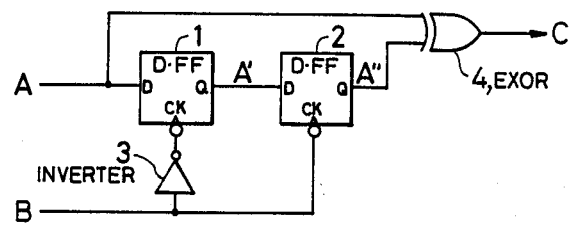
FIG. 2 is an explanation view of an embodiment of the present invention.
Figure 3:
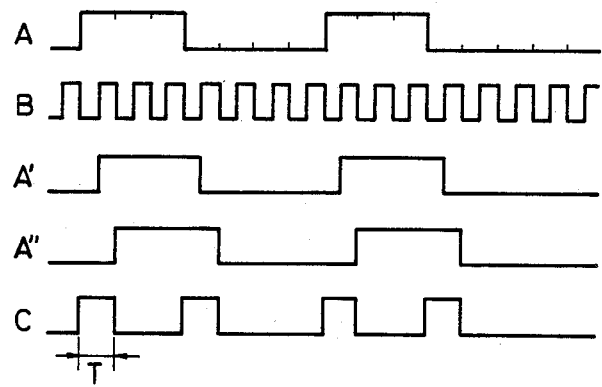
FIG. 3 is a timing chart of FIG. 2.

When the signals A and B are inputted in the terminals A and B in FIG. 2, the signal A delayed by one half cycle of the clock B is outputted to the output A' of the D-FF$_1$, and the signal A' delayed by one half cycle of the clock B is outputted to the output A" of the D-FF$_2$. As a result, when an exclusive OR of A and A' is operated, the signal which becomes "1" only at the leading edge and the trailing edge of the digital signal A in the time width T is outputted to the output of the EXOR 4, and the transmission signal C which reduces the occurrence probability of the level "1" of the digital signal A can be produced. According to the present embodiment as above described, the following effect will be expected that without widening the transmission band range by narrowing the pulse width T corresponding to the data transmission rate T, the transmission signal can be produced by converting the signal having the same occurrence probability of the level "1" as that of the level "0" into the signal having the low occurrence probability of the level "1".

Figure 4:
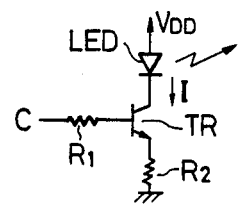
FIG. 4 is a partial explanation view of an embodiment of the present invention.

Next, the electricity-light conversion will be described referring to FIG. 4. FIG. 4 shows an example of converting the transmission signal C of FIG. 2 into light. In FIG. 4, R$_1$, R$_2$ designate resistors, TR designates a transistor, LED designates a light emission diode, V$_{DD}$ designates a power source, and a terminal C is connected to the output terminal C of FIG. 2 and inputs the transmission signal C. When the voltage between base and emitter of the transistor TR is made V$_{BE}$, the amplitude of the level "1" is made V$_1$, and the amplitude of the level "0" is made 0, and the current I flowing through the LED at the level "1" becomes (V$_1$−V$_{BE}$)/(R$_1$+R$_2$). Accordingly when the signal A having the occurrence probability of 50% of the level "1" in FIG. 1 is inputted in the terminal C, the average current of the LED becomes ½ I, which means that the LED emits light by the current of ½ I in average. However, if the transmission signal C of the present invention is inputted, the average current in the LED can be reduced. Moreover, when the same average current as that at the input time of the signal of the occurrence probability 50% flows, the amplitude of the transmission current C at the level "1" can be made large so as to enable the transmission of the digital signal by light with the better S/N ratio.

According to the present embodiment, the following effect will be expected that by using the transmission signal of the present invention to drive the light emission diode, when the same signal level as that of the signal of the occurrence probability 50% is transmitted the consumption current of the light emission diode can be reduced, and at the same consumption current the amount of light of the light emission element at the level "1" can be increased and the S/N ratio of the light signal can be improved.

Next, the receiving method in the case of transmitting the digital signals by light according to the digital signal transmission system of the invention will be described.

In the case of the signal transmission by light, the sunlight, the incandescent lamp, the fluorescent lamp, the infrared heater and so forth are regarded as the noise sources which interfere with the signals. When the diode having the wavelength of the infrared region is used as the light emission diode on the transmitting side, the visible ray can be removed through the optical filter. The noises especially in question are light rays modulated by the AC signal generated from the incandescent lamp and the fluorescent lamp. In the case of the incandescent lamp and the fluorescent lamp, the noise spectrum is as much as 100 kHz according to the real measurement, and in the case of the fluorescent lamp of the high frequency lighting type the spectrum is as much as 1 MHz. Now, on considering the transmission rate of the digital signals according to the CD format in the above-mentioned embodiment, the transmission rate is about 4 Mbi/sec. Therefore after the light signals are received, the noise has to be removed through the high pass filter (HPF).

The processing method of the reception signals in the case of interrupting the low range by the HPF will now be described (in the case of transmitting the data, the outer noises are often in the low range because the higher the transmission rate is, the more advantageous).

Figure 5:
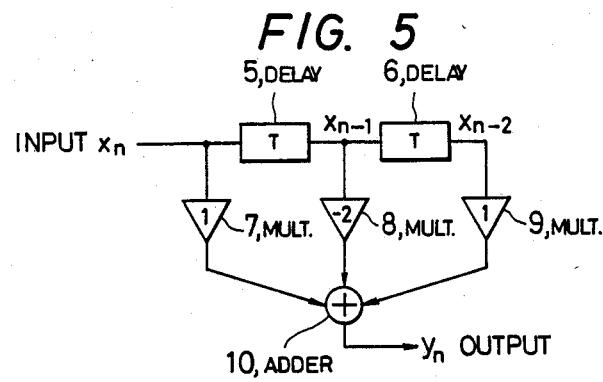
FIG. 5 is a diagram illustrating the principle of the present invention.

FIG. 5 shows an embodiment where the low range is interrupted and the transmission signal is detected. In FIG. 5, numerals 5, 6 designate delay elements of T(sec) corresponding to the data transmission rate 1/T (bit/-sec), numerals 7, 8, 9 designate coefficient multipliers which multiply the signal amplitude by a coefficient, and numeral 10 designates an adder.

The embodiment in FIG. 5 is for the purpose of computing the second order difference of the input x$_n$, and the transmission signals converted into the electric signals after receiving the transmission light are inputted in the input x$_n$. The delay elements 5 and 6 delay the input x$_n$ by T(sec). The input x$_n$ and outputs of the delay elements 5 and 6 are multiplied by 1, −2, 1 as coefficient respectively and added, then y$_n$ becomes $$y_n = x_n - 2x_{n-1} + x_{n-2} \tag{2}$$

if converted by Z, $$Y = X - 2Z^{-1}X + Z^{-2}X = (1 - 2Z^{-1} + Z^{-2})X \tag{3}$$

therefore $$F(Z) = Y/X = 1 - 2Z^{-1} + Z^{-2} \tag{4}$$

Now, when setting Z=e$^{jw}$ and W=2πfT, then $$\begin{aligned} F(e^{jw}) &= 1 - 2e^{-jw} + e^{-2jw} \\ &= -Z(1 - \cos W) \cdot e^{-jw} \\ &= -2\{1 - \cos(2\pi fT)\} \cdot e^{-j2\pi fT} \end{aligned} \tag{5}$$

Figure 6:
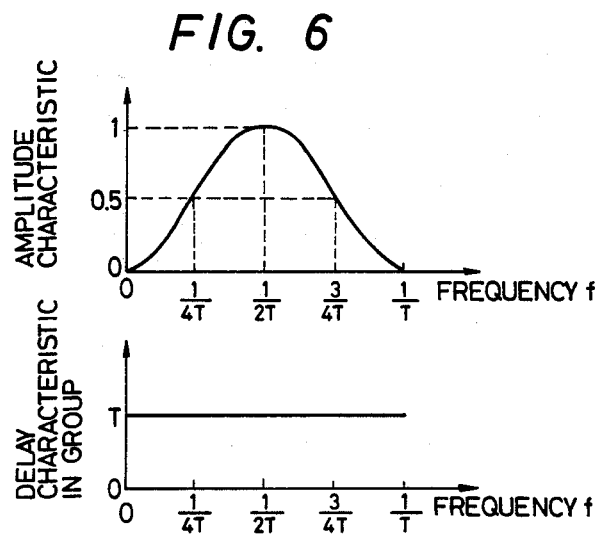
FIG. 6 is a diagram illustrating frequency characteristics of FIG. 5.
Figure 7:
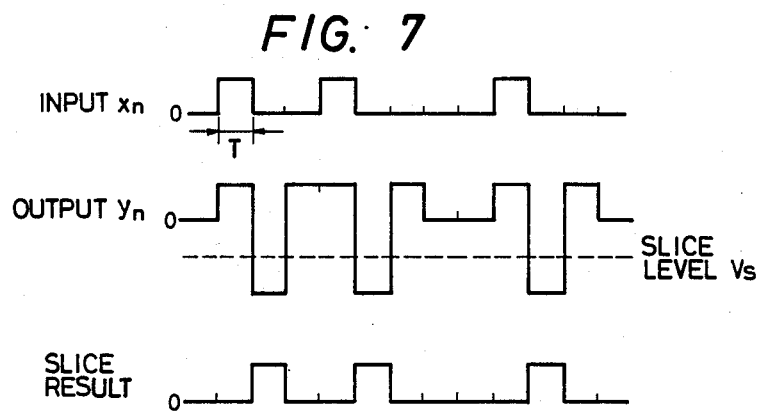
FIG. 7 is a diagram illustrating the operation in FIG. 6.

FIG. 6 shows the fundamental characteristics of the repetition of |F(e$^{jw}$)| as the amplitude characteristics and $$-\frac{1}{2\pi}\frac{d(2\pi fT)}{df} = T$$

as the group delay characteristics. As is known from the result, with respect to the frequency characteristics of the circuit in FIG. 5, the group delay characteristics are a constant value T, and the amplitude characteristics are low range interruption characteristics so as to interrupt the noises originated from the incandescent lamp, the usual fluorescent lamp and the high frequency lighting fluorescent lamp. FIG. 7 shows the operating waveform of the output $y_n$ when the input $x_n$ is inputted to the embodiment in FIG. 5, and also the result of slicing the output $y_n$ where the slice level $v_s$ is made reference level so that the output $y_n$ is made "0" when it is larger than $v_s$ and the output $y_n$ is made "1" when it is smaller than $v_s$. As is known from the result, the transmission signal of the present invention interrupts the noises in the lower range by executing the second order difference from the time T as reference so as to reproduce the signal accurately. The frequency characteristics of the circuit in FIG. 5 are an endless series of the fundamental frequency characteristics with the interval 2/T shown in FIG. 6, and the output $y_n$ in FIG. 7 indicates the response waveform which is produced by the above-mentioned endless series. If the high frequency is interrupted the waveform of the output $y_n$ becomes less steep at the leading edge and the trailing edge. In the present embodiment, although the circuit is composed of the delay element, the coefficient multiplier and the adder in order to obtain characteristics in FIG. 6, the same effect as that of the present embodiment can be achieved by approximating the amplitude characteristics at the frequency range near $\frac{1}{2}T \sim 1/T$ using resistance, capacitance and inductance.

Another embodiment of the invention will now be described referring to FIG. 8.

In FIG. 8, numeral 11 designates a digital information compressor which performs the bit compression of the digital data, and like components to those in FIG. 4 are designated by the same symbols.

The digital information compressor 11 compresses the data volume utilizing the characteristics of the input data signal, the correlation and so on. For example, if the data are audio signals, since the correlation exists between the adjacent samples, it is known well that the less amount of information will do in transmitting the data difference as the transmission information rather than in transmitting the digitized signals as they are. As for such information means, there are the compander PCM system, the difference PCM system, the vector quantization system, the adaptive difference encoding system and the band dividing encoding system. Further as the compression means of higher degree, there are the PARCOR (Partial Correlation) system, the LSP (Line Spectral Pair) system and so on. The data information compression is effected using such information compressing means, thereby the data transmission rate of the system can be reduced. Therefore if the data subjected to the information compression are transmitted according to the transmission rate of the data prior to the information compression, the data can be transmitted in the time less than the transmission time prior to the compression. FIG. 9 shows such data transmission means as is mentioned above. That is, the compressed data are transmitted by light according to the transmission rate of the data prior to the compression, and the light emission diode stops the emission during the residual time caused by the compression. As a result, the average current of the light emission diode LED in FIG. 8 can be reduced by the amount corresponding to the stop of the emission without changing the transmission rate of the data, thereby the emission peak value during the time of transmission can be increased and the transmission by light with the better S/N ratio can be performed. Furthermore in the data after the digital information compression, if the pulse of the level "1" is generated only at the changing point of the data as shown in the embodiment of FIG. 1, the multiplication effect of the present embodiment and the embodiment shown in FIG. 1 enables the digital transmission by light with the much better S/N ratio.

A further embodiment of the invention will now be described referring to FIG. 10.

FIG. 10 indicates an example of the application of the present invention to a digital audio system. In FIG. 10, numeral 12 designates a digital audio signal reproducer which receives signals recorded in the disks, tapes and so forth and the broadcasting and then reproduces the signals, numeral 13 designates a transmitting signal generator of the invention, for example, the circuit shown in FIG. 2, numeral 14 designates an electricity/light converter, LED designates a light emission element, PD designates a light reception element, numeral 15 designates a current/voltage converter, numeral 16 designates a signal reproducer, for example, the circuit shown in FIG. 5, numeral 17 designates a comparator which compares output of the signal reproducer with reference voltage $V_r$ and outputs it, numeral 18 designates a demodulator which demodulates signals modulated by the transmitting signal generator, numeral 19 designates a digital signal processor which performs processing of digital signals, numeral 20 designates a digital/analog (D/A) converter which converts digital signals into analog signals, L designates L-channel audio signal output, and R designates R-channel audio signal output.

The digital audio signal reproducer 12 reproduces signals recorded in disks, tapes and so on. The transmitting signal generator 13 generates signal with small occurrence probability of data to make the light emission diode emit light according to the invention, and the electricity/light converter 14 converts the transmission signal into light by means of the light emission element LED. The light propagated through space is received by the light reception element PD, and at the same time the light originated from incandescent lamps, fluorescent lamps, and the sunlight are also received and converted into voltage by the current/voltage converter 15. Then the signal reproducer 16 eliminates the noises due to light from the incandescent lamps and so on, and reproduces the transmission signal, and the comparator 17 reforms its waveform so as to convert it into the digital signal. The transmitting signal demodulator 18 demodulates the signals modulated by the transmitting signal generator 13 into the signals before the modulation. After the demodulated signals are processed in terms of the error correction and the interpolation and so forth through the digital signal processor 19, they are converted into the analog audio signals by the D/A converter 20 so as to reproduce the L-channel and R-channel audio signals.

According to the present embodiment the digital signals can be transmitted by light and reproduced as the audio signals.

Although the transmission of the digital audio signals has been described in the embodiment, the data transmission of computers or the like can be done as well.

A further embodiment of the invention will be described referring to FIG. 11.

The present embodiment is for the purpose that if the pulses are judged wrongly through transmission, the data thereafter are prevented from inversion. In FIG. 11, at the time of the rising from "0" to "1" of the digital signal, the signal A in the same phase as the preamble pulse is sent to follow the preamble pulse. At the time of falling from "1" to "0", the signal B in the inverse phase to the preamble pulse is sent to follow the preamble pulse. That is to say, the edge information is sent by the phase modulation system to follow the preamble pulse. As a result, the following effect is expected that the reception side can judge whether the edge information sent is the leading edge or the trailing edge, and if the edge information is transmitted wrongly, the pulse thereafter can be prevented from inversion.

An example of the application of the present invention to a CD (compact disk) player will be described referring to FIG. 12.

Figure 12:
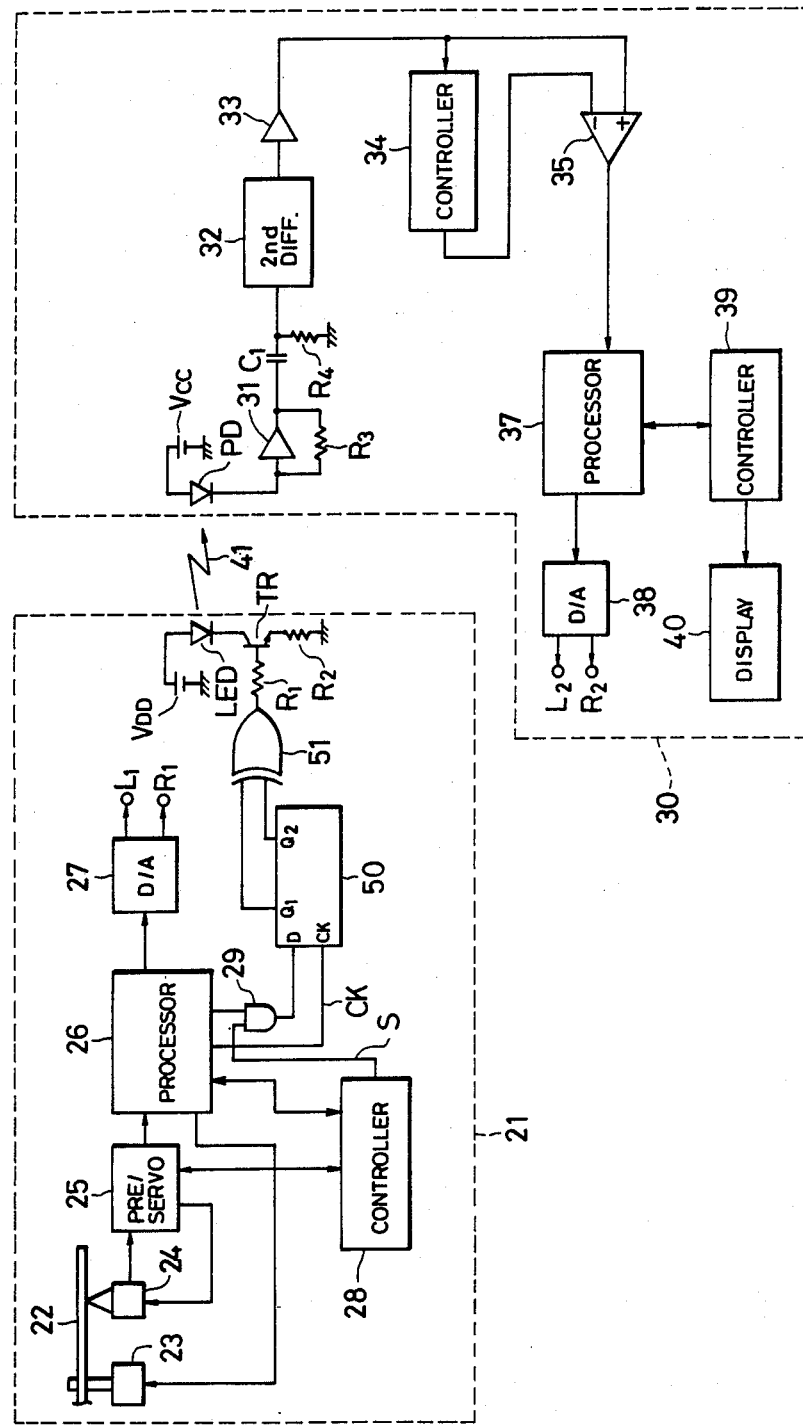
FIG. 12 is an explanation diagram of still another embodiment of the present invention.

In FIG. 12, numeral 21 designates a CD player incorporated into the digital signal transmission circuit of the invention, numeral 22 designates a disk, numeral 23 designates a disk motor, numeral 24 designates an optical pick-up which reproduces the disk recorded signal, numeral 25 designates a preamplifier servo circuit which converts the reproduced signal from the pick-up 24 into the digital signal and which controls the reproducing state of the pick-up 24, numeral 26 designates a digital signal processor which detects and corrects the errors of the digital signal of the output of the preamplifier servo circuit 25, numeral 27 designates a D/A converter which converts the digital signal into the analog audio signal, $L_1$, $R_1$ designate L-channel and R-channel audio signals respectively, numeral 28 designates a system controller of the CD player, numeral 29 designates an AND gate, numeral 50 designates a shift register, numeral 51 designates an exclusive-OR gate, $V_{DD}$ designates a power source, LED designates a light emission element, $R_1$, $R_2$ designate resistors, and TR designates a transistor. Numeral 30 designates a reception circuit, PD designates a photo detector which receives light signal 41, $V_{cc}$ designates a power source, numeral 31 designates an inverse amplifier, $R_3$ designates a resistor, and the amplifier 31 and the resistor $R_3$ constitute a current/voltage converter. $C_1$ designates a capacitor, $R_4$ designates a resistor, and the capacitor $C_1$ and the resistor $R_4$ interrupts the DC component. Numeral 32 designates a second order differential circuit, numeral 33 designates an amplifier, numeral 34 designates a control circuit of the data slice level, numeral 35 designates a comparator, numeral 37 designates a digital signal processor, numeral 38 designates a D/A converter, numeral 39 designates a system control circuit, numeral 40 designates a display circuit, and $L_2$, $R_2$ designate L-channel and R-channel audio signals respectively.

The recorded signal from the disk 22 is reproduced by the pick-up 24 and inputted into the preamplifier servo circuit 25. The preamplifier servo circuit 25 performs the wave shaping of the reproduced signal into digital signal so as to send it to the digital signal processor 26. At the same time the control signal for the pick-up 24 is generated, and controls the pick-up 24 so that it acts normally. The digital signal processor 26 executes strobing of the digital signal shaped by the preamplifier servo circuit 25, gives processing of the error detection, the correction, the interpolation and so on, and sends it to the D/A converter 27. The rotational speed of the disk motor 23 is controlled so that the transmission rate of the reproduced digital signal is kept constant. The D/A converter 27 converts the input digital signal into the analog signal, and reproduces the L-channel audio signal ($L_1$) and R-channel audio signal ($R_1$). The system control circuit 28 controls the preamplifier servo circuit 25 and the digital signal processor 26, and performs the reproduction control of the CD player.

The digital signal processor 26 extracts the bit synchronizing clock CK of the digital signal on the basis of the shaped digital signal originated from the preamplifier servo circuit 25, and sends the bit synchronizing clock CK and the digital signal to the shift register 50 to constitute the edge detection circuit. The digital signals pass through the AND gate 29 and are inputted to the D terminal of the shift register 50. The bit synchronizing clock CK is inputted to the CK terminal of the shift register 51. As a result, the output $Q_2$ of the shift register 50 lags behind $Q_1$ by one bit clock, and by calculating "or else" at the EXOR 51 the pulse "1" which is equal to the width of the bit clock is outputted from the EXOR 51 in accordance with the leading and trailing of the digital signals. The transistor TK makes the light emission element LED emit light during the pulse period of the level "1", and transmits the light signal 41 corresponding to the edge of the digital signals.

The reception circuit 30 receives the light signal 41 by the photo detector PD and converts it into current, and further converts it into voltage by means of the inverse amplifier 31 and the resistor $R_3$. Furthermore after the capacitor $C_1$ and the resistor $R_4$ interrupt the DC component, the second order differential circuit 32 reproduces the transmission signal. The transmission signal reproduced by the second order differential circuit 32 is amplified by the amplifier 33, and then inputted to the comparator 35. The output of the amplifier 33 is at the same time inputted to the data slice level control circuit 34 so as to control the slice level of the comparator 35. The transmission signal shaped by the comparator 35 is given the processing of the error detection, the correction, the interpolation and so on by the digital signal processor 37, and then inputted to the D/A converter 38 and is converted into the analog signal so as to reproduce the L-channel audio signal ($L_2$) and the R-channel audio signal ($R_2$). The system control circuit 39 controls the digital signal processor 37 and also receives the information of the time, the number and so forth included in the transmitted signals from the digital signal processor 37 and displays the information on the display circuit 40. The transmission stop signal S of the CD player 21 ceases to emit the light of the LED since the digital signals become the fixed level ("0" level in this case) except at the time when the player is reproducing normally the signals in order to prevent the light emission element LED from generating abnormally owing to the irregular change of the digital signal occurred while the player is stopped, or during accessing at random or when the focus servo is out of place.

According to the present embodiment the audio signal originated from the CD player can be transmitted by light and be received so as to reproduce audio signals.

According to the present invention, the following effect can be expected that the peak emit amount of the light emission element can be increased without widening the transmission band range so as to carry out the digital trransmission with better S/N ratio.

What is claimed is:

1. A digital signal transmission system including a light emission element for transmitting digital signals by light, comprising:

means for converting modulated data into pulse data having a plurality of pulses each having a pulse width of T seconds and corresponding to a leading edge or a trailing edge of said modulated data, wherein said modulated data maintains a level "1" and a level "0" for a duration of at least 2T seconds with respect to a data transmission rate of 1/T (bit/seconds) of the code converting means;

wherein the light emission element emits light in response to the pulse data; and receiving means for subjecting said light emitted by the light emission element to a second order differentiation, converting the differentiated data into binary signals by prescribed slice level and for demodulating the binary signals.

* * * * *